United States Patent
Li et al.

(10) Patent No.: US 8,483,524 B2
(45) Date of Patent: Jul. 9, 2013

(54) INTEGRATED ELECTRO-OPTIC DEVICE AND METHOD OF MAKING

(75) Inventors: Bing Li, Bothell, WA (US); Raluca Dinu, Redmond, WA (US); Eric Miller, Seattle, WA (US); Danliang Jin, Bothell, WA (US); Hui Chen, Kirkland, WA (US); Christopher A. Wiklof, Everett, WA (US)

(73) Assignee: GigOptix, Inc., San Jose, CA (US)

( * ) Notice: Subject to any disclaimer, the term of this patent is extended or adjusted under 35 U.S.C. 154(b) by 1238 days.

(21) Appl. No.: 12/246,957

(22) Filed: Oct. 7, 2008

(65) Prior Publication Data

US 2010/0040322 A1    Feb. 18, 2010

Related U.S. Application Data

(60) Provisional application No. 61/088,782, filed on Aug. 14, 2008.

(51) Int. Cl.
G02B 6/12 (2006.01)
G02B 6/00 (2006.01)
G02F 1/035 (2006.01)

(52) U.S. Cl.
USPC ................. 385/14; 385/3; 385/143

(58) Field of Classification Search
USPC .............. 385/1–3, 14, 141–145; 359/245, 359/237, 238, 279; 257/E21.002; 524/299; 398/195; 327/100
See application file for complete search history.

(56) References Cited

U.S. PATENT DOCUMENTS

| | | | |
|---|---|---|---|
| 5,887,116 A | 3/1999 | Grote | |
| 6,711,312 B1 * | 3/2004 | Kornrumpf et al. | 385/14 |
| 7,106,448 B1 | 9/2006 | Vawter et al. | |
| 7,283,689 B1 | 10/2007 | Block et al. | |
| 2004/0192940 A1 | 9/2004 | Huang et al. | |
| 2004/0223768 A1 * | 11/2004 | Shastri et al. | 398/183 |
| 2009/0137772 A1 | 5/2009 | Huang et al. | |
| 2010/0040322 A1 | 2/2010 | Li et al. | |

OTHER PUBLICATIONS

Dalton et al. "Polymeric Electro-optic Modulators: From Chromophore Design to Integration with Semiconductor Very Large Scale Integration Electronics and Silica Fiber Optics" (Ind. Eng. Chem. Res., vol. 38 No. 1, 1999.*
PCT International Search Report for International Application No. PCT/US2011/051802 mailed Apr. 30, 2012.

* cited by examiner

*Primary Examiner* — Uyen Chau N Le
*Assistant Examiner* — Michael Mooney
(74) *Attorney, Agent, or Firm* — Christopher A. Wiklof; Launchpad IP, Inc.

(57) ABSTRACT

An electro-optic polymer semiconductor integrated circuit includes one or more doped regions configured to drive one or more electrodes, and the electrodes are configured to drive a juxtaposed electro-optic core. The assembly may include a planarization layer disposed at least partially coplanar with the electrodes. The circuit may include an integrated multiplexer, driver configured to receive a signal from the multiplexer, at least one high speed electrode configured to be driven by the driver and modulate light energy passed through a hyperpolarizable poled chromophore regions disposed near the high speed electrode. The circuit may include a calibration storage circuit. The circuit may include, during fabrication, structures to provide voltage to a buried electrode and a shield to prevent damage from the poling field.

24 Claims, 9 Drawing Sheets

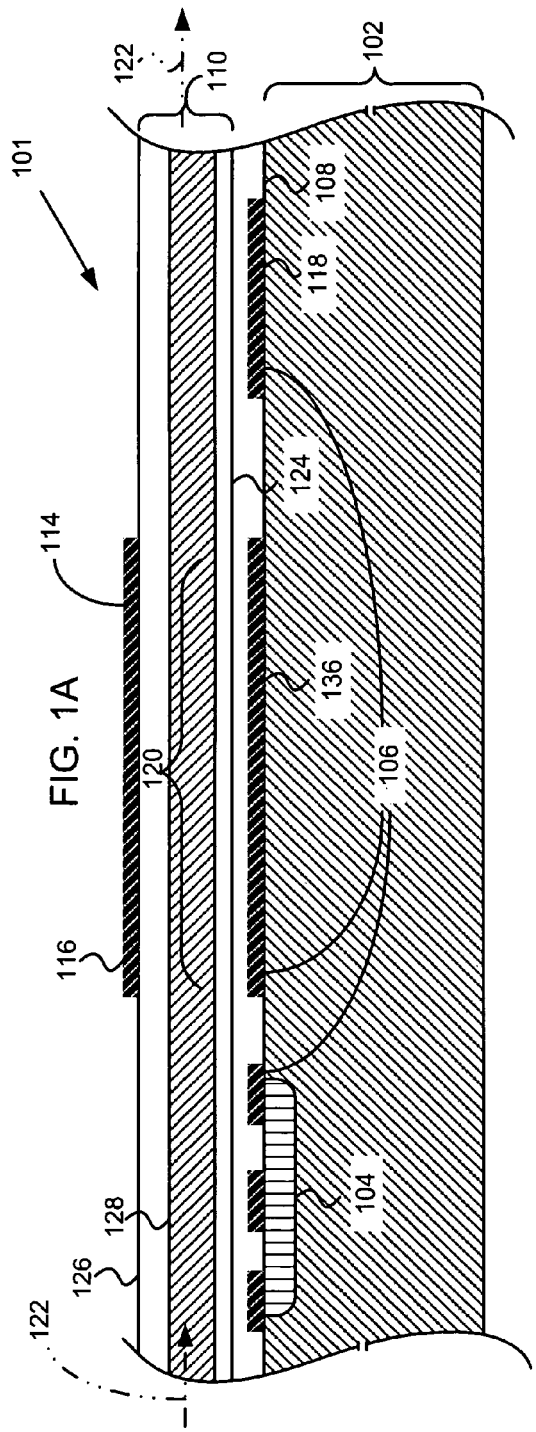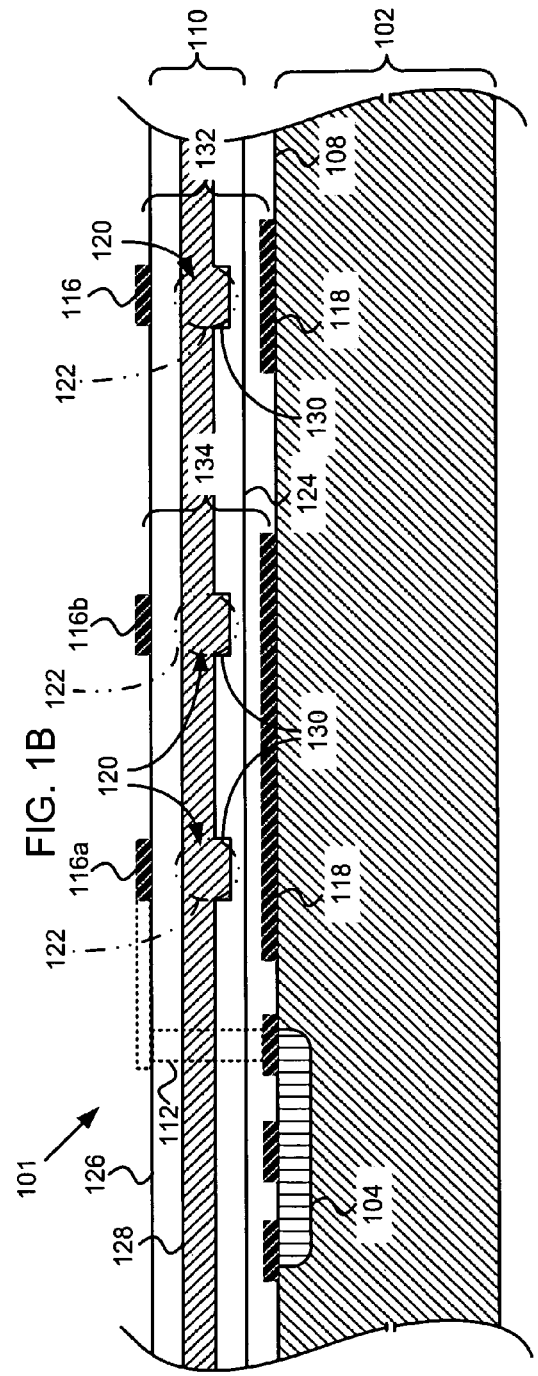

INTEGRATED ELECTRO-OPTIC DEVICE AND METHOD OF MAKING

CROSS-REFERENCE TO RELATED APPLICATIONS

The present application claims priority benefit from, and to the extent not inconsistent with the disclosure herein, incorporates by reference U.S. Provisional Patent Application Ser. No. 61/088,782, invented by Bing Li, Raluca Dinu, Eric Miller, Danliang Jin, Hui Chen and Christopher A. Wiklof, entitled INTEGRATED ELECTRO-OPTIC DEVICE AND METHOD OF MAKING, and filed Aug. 14, 2008, which is co-pending at the date of this filing.

BACKGROUND

Electro-optic polymer devices may be used for a variety of applications in telecommunications, high speed computing, etc.

SUMMARY

According to an embodiment, an integrated electro-optic device may be formed to include an optical polymer stack disposed over a semiconductor integrated circuit. The polymer stack may include at least one electro-optic layer. The semiconductor integrated circuit may be configured to modulate the at least one electro-optic layer.

According to an embodiment, a relatively low voltage semiconductor integrated circuit may be configured to drive an electro-optic polymer modulator at a corresponding voltage without additional amplification.

According to an embodiment, a semiconductor integrated circuit may include a patterned top metal layer. A planarization layer may be formed over the top metal layer, and bottom cladding, electro-optic core, and top cladding may be formed over the planarization layer to form an integrated electro-optic device. Optionally, a smooth bottom electrode may be formed over the planarization layer and below the bottom cladding. A plurality of such devices may be disposed on a singulated die. An integrated electro-optic circuit may include one or more signal multiplexers, one or more modulator drivers operatively coupled to the one or more signal multiplexers, and one or more electro-optic modulators operatively coupled to the one or more modulator drivers. The integrated electro-optic circuit may include at least one light phase bias device and may include a calibration circuit configured to provide an indication of electro-optic response to an external system. The integrated electro-optic circuit may include a feedback circuit configured to at least partially control the light phase bias device.

BRIEF DESCRIPTION OF THE DRAWINGS

FIG. 1A is a partial side sectional diagram of an integrated electro-optic circuit, according to an embodiment.

FIG. 1B is a partial cross sectional diagram of the integrated electro-optic circuit of FIG. 1A, according to an embodiment.

DETAILED DESCRIPTION

Figure 2:
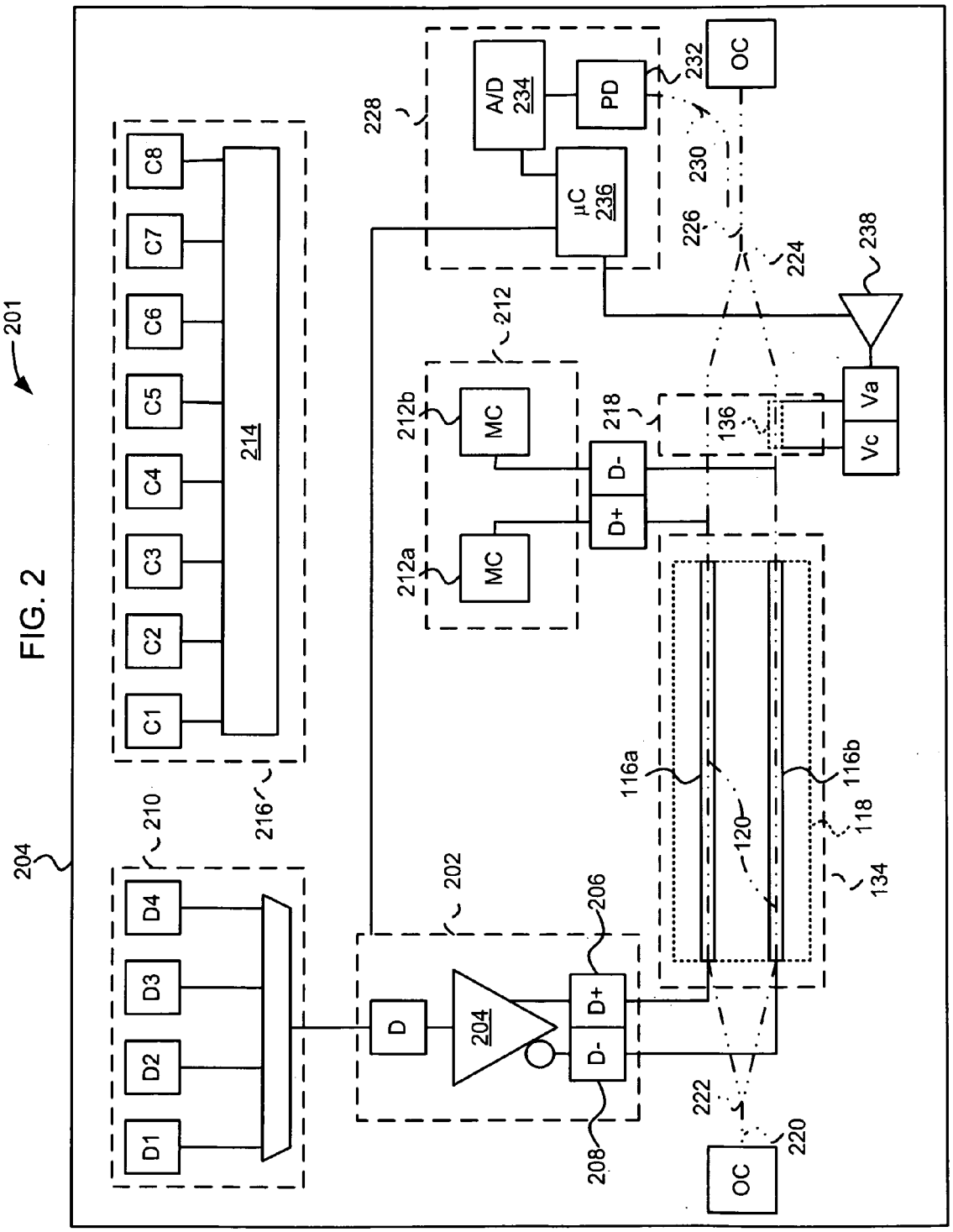
FIG. 2 is a block diagram of an illustrative integrated electro-optic circuit, according to an embodiment.

FIGS. 1A and 1B are respective side sectional and cross-sectional views of an integrated polymer electro-optic semiconductor circuit 101, according to an embodiment. A semiconductor substrate 102 includes at least one doping layer 104 patterned across the semiconductor substrate to form portions of semiconductor devices. At least one conductor layer 106 is patterned over the semiconductor substrate. A planarization layer 108 is disposed at least partly coplanar with the at least one conductor layer 106. A polymer optical stack 110 is disposed over the planarization layer 108.

At least one via 112 may at least partially extend through the polymer optical stack 110. The at least one via may be operatively coupled to a corresponding location on the at least one patterned conductor layer 106. A top conductor layer 114 is disposed over the polymer optical stack and in electrical continuity with the at least one via 112.

As an alternative to a via 112, other conductors may be substituted to electrically couple the top conductor layer to at least one location on the at least one patterned conductor layer 106. For example, the at least one conductor may be formed entirely or in combination from a via, a wire bond, a conductive bump, and/or an anisotropic conductive region.

The top conductor layer 114 may be formed to include a metal layer or a conductive polymer, for example. The top conductor may be plated to increase its thickness. The top conductor layer may include at least one high speed electrode 116 formed as a pattern in the top conductor layer 114, the high speed electrode 116 being operatively coupled to receive a signal from the at least one via 112 or other conductive structure from the corresponding location on the at least one patterned conductor layer 106. Thus, the at least one via 112 or other conductive structure is configured to transmit an electrical signal from semiconductor electrical circuitry formed on the semiconductor substrate 102 to the at least one high speed electrode 116 through or around the polymer optical stack 110.

According to embodiments, the at least one patterned conductor layer 106 is configured to form a ground electrode 118 parallel to the at least one high speed electrode 116. An active region 120 of the polymer optical stack 110 is positioned to receive a modulation signal from the high speed electrode 116 and the ground electrode 118. The active region 120 includes a poled region that contains at least one hyperpolarizable organic chromophore.

The polymer optical stack 110 is configured to support the active region 120 as well as receive and guide light 122 to and from the active region. The polymer optical stack 110 may include at least one bottom cladding layer 124 and at least one top cladding layer 126 disposed respectively below and above an electro-optic layer 128. The bottom 124 and top 126 cladding layers, optionally in cooperation with the planarization layer 108, are configured to guide inserted light 122 along the plane of the electro-optic layer 128. Light guiding structures 130 are formed in the polymer optical stack 110 to guide the light 122 along one or more light propagation paths through the electro-optic layer 128 and/or non-active core structures (not shown). In the embodiment of FIGS. 1A and 1B, the guidance structures 130 are formed as trench waveguides that include etched paths in the at least one bottom cladding layer 124.

Hyperpolarizable organic chromophores are generally formed as molecules having a structure D-π-A, where D is an electron donor structure, A is an electron acceptor structure having a relatively higher electron affinity than the electron donor structure D, and π is a pi-orbital conjugated bridge that freely permits electron flow between the donor D and the acceptor A. The molecules are generally linear and nominally polar due to the difference in electron affinities between the donor D and acceptor A. Such molecules may be poled into alignment by applying an electrical poling field during manufacture, the acceptor A portions being drawn toward a positive potential and the donor D portions being drawn toward a negative potential. The molecules may then be locked into the desired alignment by cross-linking or freezing a polymer matrix in which the chromophores are embedded. Alternatively, the chromophores may be covalently bound or otherwise substantially fixed in their poled positions.

After poling, an electrical modulation field may be imposed through the volume of chromophores. For example, if a relatively negative potential is applied at the negative end and a relatively positive potential applied at the positive end of the poled chromophores, the chromophores will at least partially become non-polar. If a relatively positive potential is applied at the negative end and a relatively negative potential is applied at the positive end, then the chromophores will temporarily hyperpolarize in response to the applied modulation field. Generally, organic chromophores respond very quickly to electrical pulses that form the electrical modulation field and also return quickly to their former polarity when a pulse is removed.

A region of poled hyperpolarizable organic chromophores generally possesses a variable index of refraction to light. The refractive index is a function of the degree of polarization of the molecules. Thus, light that passes through an active region will propagate with one velocity in a first modulation state and another velocity in a second modulation state. This property, along with the fast response time and a relatively high sensitivity to changes in electric field state make hyperpolarizable organic chromophores excellent bases from which to construct very high speed optical modulators, phase shifters, etc.

The integrated polymer electro-optic semiconductor circuit 101 includes a semiconductor electrical circuit formed from a complex of the doping layer pattern 104 and the at least one patterned conductor layer 106. According to an embodiment, the semiconductor electrical circuit is configured, when in operation, to drive the electrodes 116, 118 with a series of modulated electrical pulses. A resultant modulated electrical field is thus imposed across the active region 120 and results in modulated hyperpolarization of the poled organic chromophores embedded therein. A complex of electrodes 116, 118, active region 120 and light guidance structures 130. The modulated hyperpolarization may thus modulate the velocity light passed through the poled active region 120 of the polymer optical stack 110. Repeatedly modulating the velocity of the transmitted light creates a phase-modulated light signal emerging from the active region. Such an active region 120 may be combined with light splitters, combiners (not shown), and other active regions to create light amplitude modulators, such as in the form of a Mach Zehnder optical modulator.

A combination of at least one electro-optic active region 120, at least two electrodes 116, 118, and corresponding light guiding structures 124, 126, 130 may be considered an electro-optic device 132, 134. A two-channel electro-optic device 134 may be formed from one ground electrode 118 and corresponding pairs of active regions 120 and high speed electrodes 116a, 116b. The two channels of a two channel electro-optic device 134 may operate in cooperation, such as in a push-pull manner to form a Mach Zehnder optical modulator.

Additional devices may be formed using electrodes or resistors 136 that are not configured for high speed operation. The operation of one such illustrated device is described below in conjunction with the description of an optical phase bias device.

FIG. 2 is a block diagram of an illustrative integrated polymer electro-optic semiconductor circuit 201, according to an embodiment. The integrated polymer electro-optic semiconductor circuit 201 includes a driver circuit 202 including at least one amplifier 204 formed from a complex of doped semiconductor regions 104 and the patterned at least one conductor layer 106 shown diagrammatically in FIGS. 1A and 1B. The driver circuit 202 is operable to amplify a multiplexed signal to produce a series of relatively low voltage modulated electrical pulses. The modulated electrical pulses are conducted to two high speed electrodes 116a, 116b disposed over corresponding active regions 120 shown diagrammatically in FIGS. 1A and 1B and a combined ground electrode 118.

The illustrative integrated circuit 201 includes a push-pull Mach Zehnder modulator 134. Accordingly, an output stage 204 of the driver circuit 202 includes an output 206 that drives a D+ node and a complementary output 208 that is modulated inversely from the output 206 to drive a D− node. The output 206 and complementary output 208 are each conducted to a corresponding high speed electrode 116a, 116b. Each high speed electrode 116a, 116b is thus driven by an electrical signal that is the inverse of the electrical signal delivered to the other high speed electrode 116b, 116a. The driver circuit 202 may be further configured to drive the ground electrode 118 to a desired voltage. While the term "ground" is used generically, and in some cases may equal actual chip ground, a different potential or set of potentials may alternatively be used to form the ground potential.

According to an alternative embodiment, the output stage 204 of the driver circuit 202 includes an output 206 that drives a single node. The output 206 is conducted to a corresponding high speed electrode 116. The high speed electrode 116 is thus driven by an electrical signal that modulates a single channel active region 120. Such an alternative embodiment may form a single channel phase modulator.

According to another alternative embodiment, two output stages may be synchronized (with or without phase offset or inversion), each output stage including an output that drives a single node. Since the output stages are synchronized, they may be used to cooperatively drive respective electro-optic channels, for example as complementary channels, as phase-delayed channels, or in another relationship. The separate synchronized output channels may alternatively be used to drive a single electro-optic modulation channel, for example by combining their outputs in a cascade, by inputting signals at separate signal injection points, or by using one node to drive a signal at the front end of the high speed electrode and using another node to drive a corresponding signal at the back end of the high speed electrode (e.g., in a bipolar drive arrangement). Especially in the latter configuration, signal matching circuitry (described below) may be omitted, the function thereof being provided by the back end drive signal.

The driver circuit 202 may receive the multiplexed signal through a node D from a multiplexer circuit 210 that is also formed from a complex of doped semiconductor regions 104 and the patterned at least one conductor layer 106 shown diagrammatically in FIGS. 1A and 1B. The multiplexer circuit 210 is operable to multiplex a plurality of input signals received at nodes D1, D2, D3, and D4 to produce the multiplexed signal at node D. The nodes D1, D2, D3, and D4 may be operatively coupled to a plurality of package leads for receiving corresponding data signals from a system (not shown) in which the integrated polymer electro-optic semiconductor circuit 201 is disposed.

According to an embodiment, the multiplexer circuit 210 includes an N×M multiplexer. For example, N may be 2, 4, 8, 16, or 32. M may be a frequency such as 2.5 GHz, 10 GHz, 25 GHz, 40 GHz or 100 GHz. According to an embodiment, the multiplexer circuit 210 is a 4×2.5 Gbps multiplexer that produces a 10 Gbps multiplexed signal at node D.

The illustrative integrated circuit 201 also includes integrated matching circuitry 212a, 212b configured to receive pulses from the respective high speed electrodes 116a, 116b and substantially prevent reflections. The matching circuitry 212a, 212b may be formed at least partially from a patterned region of the top conductive layer and may be coupled to the high speed electrodes 116a, 116b at locations selected to tune their frequency response to a desired bandwidth. The matching circuitry may include a plurality of connections to each of the high speed electrodes 116a, 116b. The matching circuitry may be further formed at least partially from a complex of patterned at least one doping layer 104 and patterned at least one conductor layer 106 shown diagrammatically in FIGS. 1A and 1B. Thus, the high speed electrodes are able to support traveling electrical pulses that enter at the left end and propagate left-to-right along their length. Accordingly, high bandwidth pulses may form a traveling waveform that is substantially synchronized with the velocity of light traveling through the active regions.

While processing of optical polymers and hyperpolarizable organic chromophores may generally be quite repeatable, variations in ambient temperature, processing, material, or fabrication tolerances may create variations in the response of a given optical device or portion of an optical device formed in part by the active region. Such variations in response may be compensated for by providing a phase bias structure and/or by selecting a modulation voltage, phase, duty cycle, etc.

The integrated polymer electro-optic semiconductor circuit 201 may include a calibration storage circuit 214. The calibration storage circuit 214 is configured to store at least one calibration value corresponding to a response of the electro-optic circuit to a signal imposed from a system (not shown) to which the integrated electro optic semiconductor circuit 201 is coupled. The calibration storage circuit 214 includes at least one node C1, C2, C3, C4, C5, C6, C7, C8 216 corresponding to a package lead coupled to the calibration value, the package lead configured to provide the calibration value to the system.

The calibration storage circuit 214 may be formed from an array of fusable links or non-volatile storage memory such as flash, ROM, mask ROM, PROM, EPROM, EEROM, or other memory technology compatible with the processing technology used to form the semiconductor portion of the integrated circuit 201. Alternatively, the calibration storage circuit may be formed in the package but on a structure separate from the semiconductor substrate, and may use a memory technology not necessarily compatible with the integrated circuit 201.

The integrated polymer electro-optic semiconductor circuit 201 may further include at least one second region of the polymer optical stack positioned proximate to a bias resistor 136, also shown in FIG. 1A. An unpoled region of the electro-optic layer 128 including at least one hyperpolarizable organic non-linear chromophore may form a portion of a thermo-optic bias device 218 configured to uniformly phase shift a phase modulated light signal transmitted therethrough. The bias device 218 is responsive to a voltage difference between bias signals Vc, Va received from the system (not shown) (or alternatively, as described below, from a voltage source driven by an integrated feedback circuit) and delivered to the bias resistor 136. The bias signals Vc, Va may be used to heat the region of the electro-optic layer 128 to produce a relatively stable phase offset to a light signal delivered through one of the active regions 120 to produce phase-matched modulated light signals. According to embodiments, the bias resistor 136 is driven to dissipate less than about 10 to 50 microwatts.

The optical bias device 218 may be used to tune the optical output to normally low or normally high at no pulse, may be used create zero crossings at desired points in the pulses, and/or may be used to compensate for device-to-device variations in response.

While the description of FIG. 2 presented heretofore has focused on the electrical portions of the circuitry, optical circuitry is also present in the integrated electro-optic polymer semiconductor integrated circuit 201, as described above. Optical transmission paths are shown in long-short dashed lines to make them easier to see relative to the electrical portions of the circuit.

A coherent light signal 122 enters an input waveguide 220. Typically, the light 122 may be provided by a laser, such as an infrared fiber laser (not shown), that may be disposed off chip. The light from the infrared fiber laser is coupled to the input waveguide 220 using an optical coupler.

Light proceeds along the input waveguide 220, guided as described above, and is then split into two components by a splitter 222. From there, the two components propagate to the active regions as described above. The complementary driver circuit 202 drives one electrode 116a to increase in voltage and the other electrode 116b to decrease in voltage corresponding to the multiplexed data signal. Thus, light propagates faster along one active region of the two channel device 134 than the other region of the two channel device. The two phase-shifted channels are then recombined at a combiner 224. Because the input light is coherent, it may constructively interfere if the phase difference between the two channels corresponding respectively to electrodes 116a and 116b bis substantially zero or a multiple of $2\pi$ radians offset. Alternatively, the combined light may destructively interfere at the combiner 224 if the phase difference between the channels is other than $2\pi$ radians phase offset, and may reach a maximum modulation depth, including up to substantial extinction, at odd multiples of $\pi$ offset. Thus, the complementary pulses to which the electrodes 116a and 116b are driven may be converted from complementary phase modulation to amplitude modulation. After the light channels are combined, the modulated light propagates out along an output waveguide 226, which may be coupled to other optical devices and/or be transmitted off-chip through an output fiber coupling (not shown).

The (minimum) voltage at which maximum modulation depth occurs in a device may be referred to as $V\pi$. Depending on context, $V\pi$ may refer to a voltage magnitude applied to each of two push-pull electrodes or a voltage applied to a single modulation channel. Hyperpolarizable organic chromophore-based electro-optic devices generally have an advantage over prior art electro-optic devices with respect to $V\pi$. In particular, hyperpolarizable organic chromophore-based electro-optic devices may be configured to reach acceptable modulation depths when driven at a $V\pi$ as low as voltages that may be directly output by relatively low voltage semiconductor devices, including CMOS devices. Acceptable performance may be achieved at a drive voltage of about 2 volts or less.

Optionally, an integrated feedback circuit 228 may be configured to measure the modulated light output signal delivered to the output waveguide 226. The feedback circuit 228 may determine the bias voltage Vc and/or Va that drive the bias resistor 136.

For example, the feedback circuit 228 may include a coupling waveguide 230 configured to evanescently receive a small portion of the output signal from the output waveguide 226. The thus tapped light signal may be converted to an electrical signal by a photodetector 232. An analog-to-digital converter 234, which for example may be formed from one or more comparator circuits, may be sampled by an embedded microcontroller 236 at one or more frequencies selected to determine a depth of modulation.

For example a short range modulated light signal may have a desired modulation depth of about 5 dB or more. A long range modulated light signal may have a desired modulation depth of about 20 dB or more. The microcontroller 236 may be operatively coupled to control the gain of an amplifier or attenuator 238 that drives the bias voltage across the bias resistor 136. Additionally or alternatively, the microcontroller 236 may be operatively coupled to control the gain of the driver circuit 202.

Figure 3:
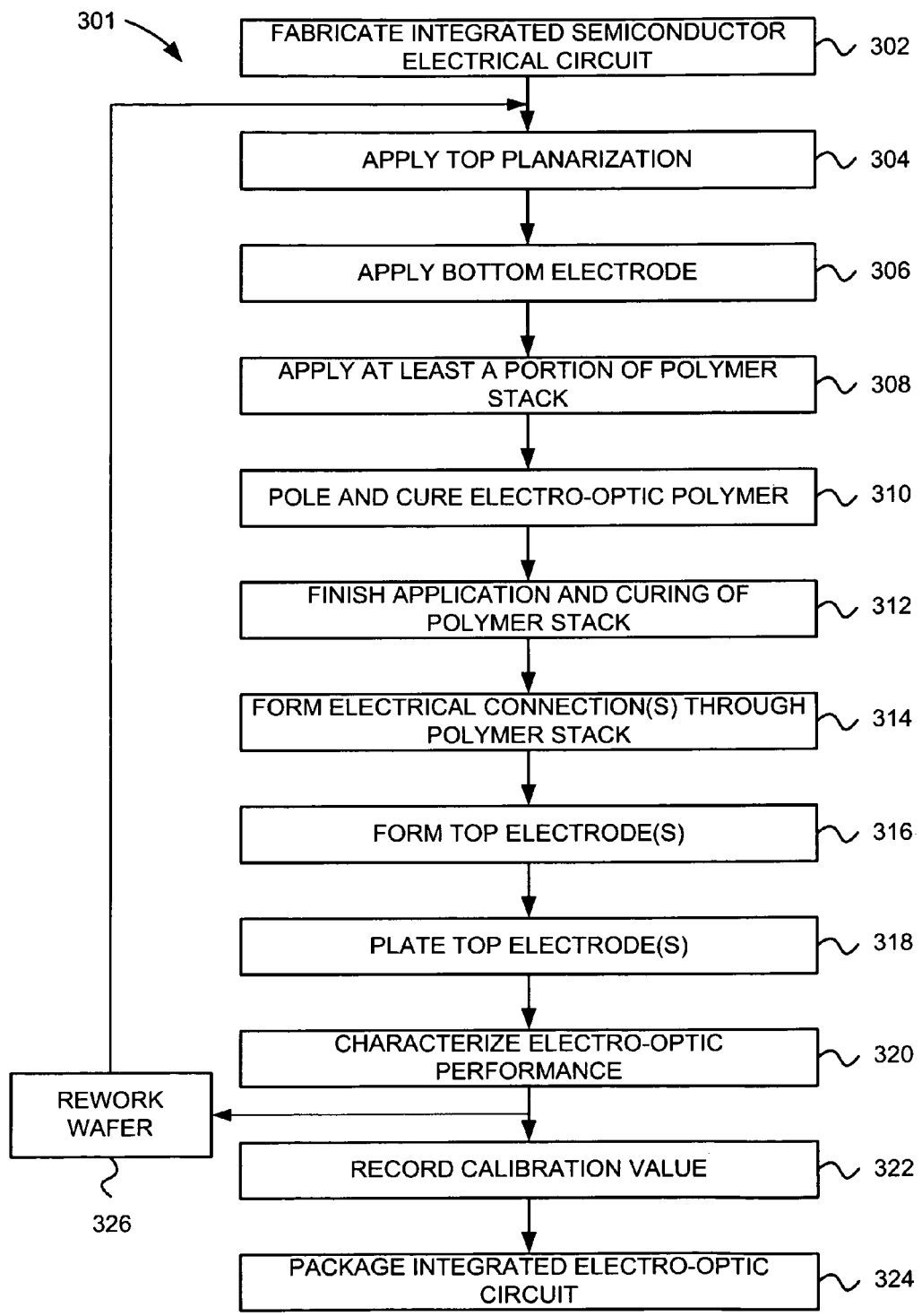
FIG. 3 is a flow chart illustrating a method for making an electro-optic polymer semiconductor integrated circuit, such as those shown in FIGS. 1A, 1B, and 2, according to an embodiment.

FIG. 3 is a flow chart illustrating a method 301 for making an electro-optic polymer semiconductor integrated circuit, such as embodiments shown in FIGS. 1A, 1B, and 2, for example, according to an embodiment.

In step 302, an integrated semiconductor electrical circuit may be formed, for example by using conventional MOS, NMOS, PMOS, or CMOS to form an integrated semiconductor circuit 102. Alternatively, the semiconductor integrated electrical circuit may be fabricated or purchased in the form of a partially or fully processed semiconductor wafer. For electro-optic modulator technologies such as lithium niobate that require higher modulation voltages than the approximate 2 volts or less required by an electro-optic chromophore modulator, other semiconductor technologies that output higher voltages, such as MOS or BiCMOS, may be used to form the semiconductor integrated circuit 102. Optionally, other semiconductor technologies such as III-IV semiconductors may be used to form the semiconductor integrated circuit.

As described above, the semiconductor integrated circuit may include one or more doped semiconductor junctions configured to provide a signal to or receive a signal from the at least one electrode. For example, a doped semiconductor junction may form an output transistor configured to drive the at least one electrode. For example, the at least one electrode may be toggled relative to a ground electrode that is later formed above the optical polymer stack or may maintain the at least one electrode at a selected voltage relative to a toggled electrode that is later formed above the optical polymer stack.

Proceeding to step 304, the surface of the integrated semiconductor circuit is planarized. The planarization layer may be formed from a variety of transparent or opaque materials. According to an embodiment, the planarization layer may be formed from a heat-reflow material, such as phosphorous- or boron-doped silicon dioxide for example. The planarization layer may additionally or alternatively be mechanically planarized, etched to a planar configuration, be chemical mechanical planarized (CMP), etc. According to an embodiment, the planarization layer may be formed from a material such as a sol-gel, OSG, etc. In some embodiments, it may be desirable to select a planarization material that is relatively transparent and non-scattering to a wavelength of light that is propagated through the optical polymer stack. Forming the planarization may include spinning, spraying, or otherwise applying the planarization material, followed by grinding, polishing, etching, CMP, and/or heat reflowing to planarize.

According to an embodiment, planarization produces a surface with a roughness of about 10 nanometers root-mean-average (RMA) or less and a flatness less than or equal to about ±10 microns total thickness variation (TTV).

Proceeding to step 306, a bottom electrode may be formed, for example over the planarization layer. The bottom electrode formation step 306 may include etching and filling one or more vias through the planarization layer to one or more conductive pads. The surface of the planarization layer may then be sputtered, for example with gold, and etched to form a patterned seed layer. The patterned seed layer may then be plated to a desired thickness. According to an embodiment, the bottom electrode is planar to about 10 nanometers RMA to minimize optical loss.

Optionally, at least one conductive layer, such as an upper metal layer, may be plated. This may be used to increase the thickness of the at least one electrode and thereby increase its current carrying capacity.

Steps 302, 304 and 306 result in providing a planarized semiconductor integrated circuit including a plurality of ground electrodes operatively coupled to a plurality of semiconductor junctions. One or more of the steps 302, 304, and 306 may be carried out at a facility that also performs additional steps described below. Alternatively, the planarized semiconductor integrated circuit may be provided by purchasing the circuit from a supply partner.

Proceeding to step 308, the planarized semiconductor integrated circuit, for example in the form of a processed silicon wafer has at least a portion of an optical polymer stack applied. At least a portion of the optical polymer stack includes forming at least a bottom cladding layer over the planarized semiconductor integrated circuit, and forming an organic hyperpolarizable electro-optic chromophore layer over the bottom cladding layer.

The bottom cladding layer may include, for example, a polymer, an electro-optic polymer with a lower refractive index than the electro-optic polymer layer, an organic-inorganic hybrid, an inorganic material, or a combination thereof.

Additionally, step 308 may include fabricating additional light guiding structures. In some embodiments, the light guiding structure includes an optical waveguide in the form of a trench, a side clad, a channel, a rib, a quasi trench, or a quasi rib. A top cladding layer and a polling electrode may be formed over the electro-optic layer.

Proceeding to step 310, at least portions of the hyperpolarizable electro-optic chromophores arranged adjacent the electrodes are poled and cured to substantially fix the alignment of the electro-optic chromophores in the chromophore layer in their poled orientation.

A poling apparatus may include a poling electrode that is held in contact with the surface of the partial optical polymer stack, or a corona discharge mechanism such as a high voltage grid above the surface in which charges are introduced to the surface through ionization of a gas. Typically, in either approach, poling is performed under a substantially inert gas such as helium, nitrogen, or argon. The entire semiconductor wafer or at least the chromophore layer is cured while the poling voltage is maintained. For example, the assembly may be raised to a temperature of approximately 140 degrees C. while a poling voltage of about 400 to 1100 volts is held across the electro-optic layer. According to some embodiments, the poling voltage may be about 900-1000 volts. The temperature and poling voltage may be maintained for about 1-2 minutes, the voltage holding the poled orientation of the chromophore molecules while a host polymer is cross-linked to "trap" the chromophores in their poled orientation. Alternatively, a UV or other radiation cured host polymer may be used and curing may include application of cross-linking radiation instead of or in addition to the application of heat. Alternatively, the chromophores themselves may include cross-linking portions and the chromophores may covalently bond to a host polymer and/or to one another to maintain orientation.

In some embodiments, the poling electrode may be wider than a trench, rib, quasi trench, or quasi rib guiding structure so that the electric field generated between the poling electrode and ground electrode is wider than the waveguide. For the rib or quasi rib forms, a top cladding layer or portion of a top cladding layer may be thicker in areas adjacent to the waveguide than in the area between the waveguide and poling electrode. In another embodiment, the electro-optic polymer layer includes a quasi trench and the polymer stack further includes a first polymer side clad and a second polymer side clad adjacent to the quasi trench and overlying the bottom cladding layer.

Typically, the poling temperature is within ±15° C. of the glass transition temperature ($T_g$) of the electro-optic polymer layer; but the poling temperature may be another temperature at which the chromophores are mobile enough for alignment at a given poling field voltage. Further maintenance of the poling temperature may be sufficient to induce curing. Alternatively, the temperature may be raised or lowered to allow curing to progress.

Proceeding to step 312, the remainder of the optical polymer stack is applied and cured. This step may include stripping a poling electrode, if used, prior to applying one or more additional layers. The poling electrode may be removed, for example, by wet etching, dry etching, or a combination thereof. After the poling electrode is removed, the surface may be treated with, for example, plasma, adhesion agents, solvents, or any combination thereof to improve surface quality and adhesion of the upper cladding layer.

A polymer top cladding layer is formed over the electro-optic chromophore layer. Depositing the upper cladding layer (or other layer) may include, for example, spin deposition, dip coating, screen printing, evaporation, chemical vapor deposition, sputtering, vacuum deposition, etc. In some embodiments, the top cladding layer is formed from photo-cross-linkable epoxies or a photo-cross-linkable acrylates.

Proceeding to step 314, a plurality of conductive vias are formed through the polymer bottom clad layer, the organic hyperpolarizable electro-optic chromophore layer, and the polymer top clad layer. For example, such vias may be formed by etching the cured materials and filling the etched voids with a conductive material. The conductive material may include a vacuum deposited metal such as gold or aluminum, or a conductive polymer. Optionally, the etched holes may be lined with an insulating material such as an insulating polymer or other material prior to filling with a conductive material. Alternatively, conductive vias may not be formed and instead gold wirebonds or other structure may be formed to operatively couple portions of the semiconductor circuit to the top electrodes.

Proceeding to step 316, top electrodes are formed. For example top electrodes may include high speed strip electrodes. Alternatively, ground electrodes may be formed on top of the optical polymer stack and the electrodes formed from the at least one semiconductor integrated circuit metal layer may be configured as high speed electrodes.

In optional step 318, the top electrodes may be plated. Plating may be used to increase the current carrying capacity of the top electrodes, and may be especially useful when the top electrode is configured to be voltage toggled.

After the top electrodes are formed (and optionally plated), the process 301 proceeds to optional step 320. In step 320, at least one performance parameter of at least one optical modulation channel is characterized. An optical modulation channel is formed by a corresponding trio of the ground electrode, high speed electrode, and poled and fixed hyperpolarizable electro-optic chromophore portion. As described in part above, the relative phase, frequency response, extinction ratio, optical loss, and/or other aspects of performance of an electro-optic device may vary according to variations in chemistry, the fabrication process, design, manufacturing equipment or other effects. To provide a relatively uniform response from part to part, it may be desirable to provide to a host system an indication of one or more performance parameters. If, for example, a given device is determined to have somewhat higher optical loss than nominal (but below allowable limits), a system may provide a higher output illumination source into the device to compensate for the higher loss. In another example, if a given amplitude modulation device is found to have somewhat less that complete extinction of light at a nominal off state, then the Vπ modulation voltage may be increased somewhat to achieve more complete extinction (destructive interference) of the light.

In step 320 (which may optionally occur after singulation and/or device packaging) device performance is characterized by measuring a response. According to an example, optical probes may be inserted into the polymer optical stack at locations correlated to a light input location and a light output location. The device may be operated, for example using a bed of nails or other probe, to modulate light received from the test apparatus. An optical signal received at the output optical probe may be measured, compared to nominal values, and a calibration value determined. The calibration value may directly represent a measured response, or alternatively may be a value that corresponds to the response in a known way. According to an embodiment, one or more response aspects may be measured, combined, and the combined value used to access a look-up-table (LUT) to determine a calibration value.

Proceeding to step 322, the calibration value (or a data value corresponding to the calibration value) may be recorded on the electro-optic polymer semiconductor integrated circuit for future reference by a system. Optionally, the calibration value may be stored and later written to the integrated circuit after packaging.

Proceeding to step 324, the electro-optic polymer semiconductor integrated circuit is packaged to include one or more optical couplers and a plurality of package leads operatively coupled respectively to optical and electrical nodes on the die. As mentioned above, the performance of the electro-optic polymer semiconductor integrated circuit may optionally be characterized and the calibration data written after packaging.

Optionally, for embodiments where characterization 320 is performed at the wafer level, if the optical polymer stack is found to be detective, the wafer may be reworked, as indicated at 326. Reworking may include etching to remove the detective polymer stack and planarizing the wafer again.

Figure 4:
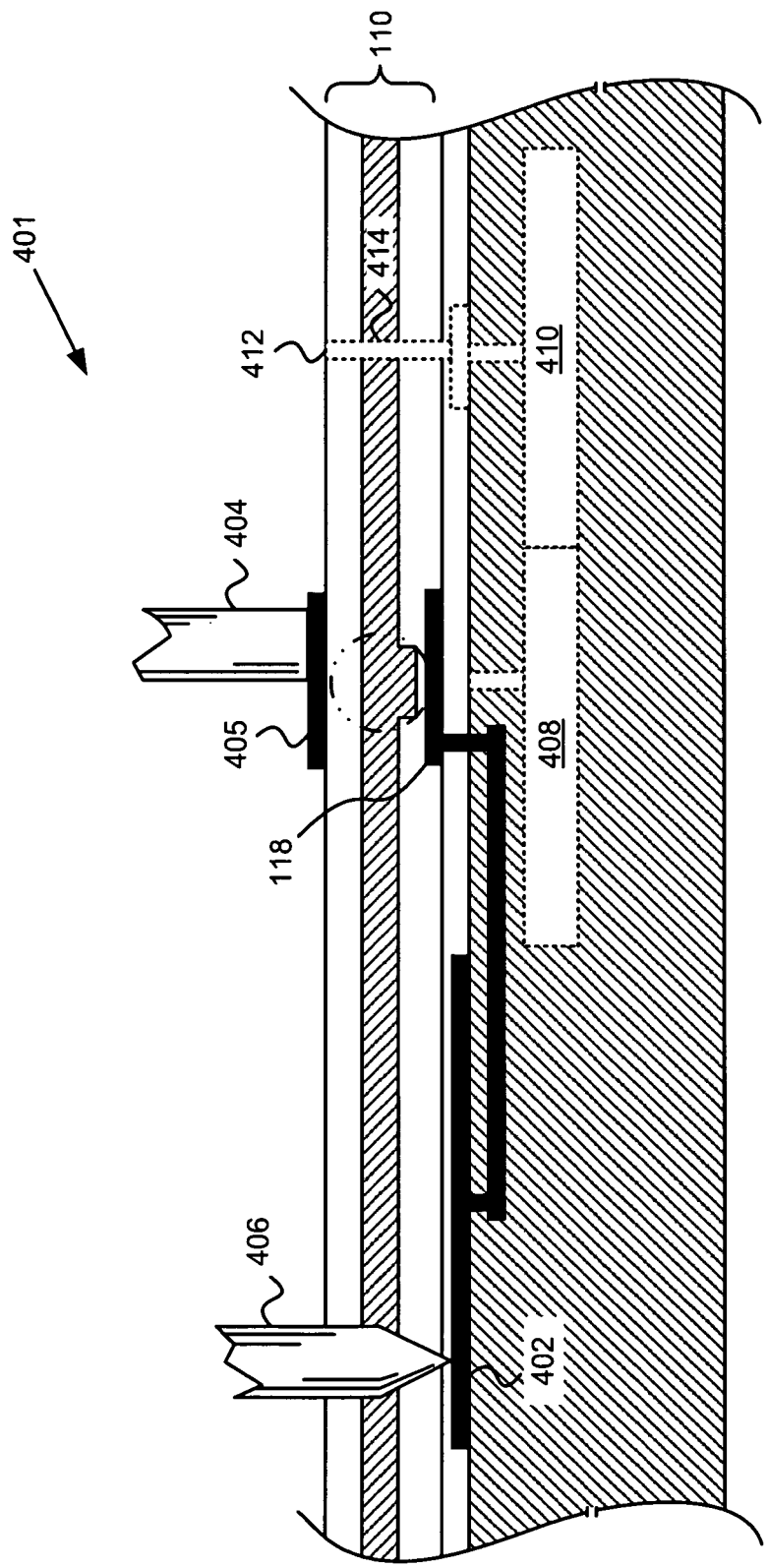
FIG. 4 is a diagram illustrating a poling configuration used to make an integrated electro-optic circuit, according to an embodiment

FIG. 4 is a sectional diagram illustrating a poling configuration 401 used to make an integrated electro-optic circuit, according to an embodiment. As shown in FIG. 4, a bottom electrode 118 may be provided electrical continuity with a poling pad 402. The poling pad 402 may be disposed near the bottom electrode 118. Alternatively, the poling pad 402 may be disposed some distance from the bottom electrode 118. According to an embodiment, a poling pad 402 may be provided electrical continuity with a plurality of bottom electrodes 118. Optionally, a poling pad 402 may be configured to have electrical continuity with a plurality of bottom electrodes 118 when the assembly is in wafer form, and then the continuity may be broken (and optionally the poling pad discarded), when the integrated dice are singulated.

The embodiment of FIG. 4 also illustrates an alternative placement of the bottom electrode 118. For comparison, FIGS. 1A-1B illustrates a bottom electrode 118 that is formed at least partly from the topmost metallization layer disposed on the semiconductor integrated circuit 102. In comparison, the bottom electrode 118 of FIG. 4 is formed over the planarization layer 108. The configuration of FIG. 4 may be preferable in some embodiments for maintaining bottom electrode flatness.

With reference to FIG. 4, a contact electrode 404 may be placed to provide a first potential at an upper surface of the optical polymer stack 110. In the example shown, an upper poling electrode 405 is formed over at least a portion of the optical polymer stack 110, and a removable contact electrode 404 is placed in contact with the upper electrode 405. The contact electrode 404 may drive the upper electrode 405 or the surface of the at least partial optical polymer stack at a first poling potential.

A second removable contact electrode 406 may pierce or otherwise pass through the optical polymer stack 110 to make electrical contact with the poling pad 402. Since the poling pad 402 is in electrical continuity with the lower electrode 118, a second poling potential imposed by the second removable contact electrode 406 is communicated to the lower electrode 118. Accordingly, a poling voltage is provided across the electro-optic active region disposed between the upper 405 and lower 118 electrodes. While the first and second poling potentials provide a poling voltage to at least a portion of an electro-optic chromophore region disposed proximate the electrodes, the electro-optic active region 120 and other uncured portions of the optical polymer stack 110 may be cured as described above.

The top poling electrode 405 formed at the surface of the optical polymer stack prior to applying the poling potential may include a temporary top poling electrode that is in place during poling. In such an embodiment, the top poling electrode 405 may be subsequently removed from the surface of the optical polymer stack after poling and curing the electro-optic polymer, according to procedures described above. Alternatively, poling may be performed after substantially the entire optical polymer stack 110 is formed. In such embodiments, the upper poling electrode may be an upper electrode 116, 136 that remains with and is configured to modulate the device.

As an alternative to the configuration of FIG. 4, a conductive via may be formed to couple to the poling pad 402 and electrical contact made to the conductive via during poling. The poling pad 402 is configured to receive the poling voltage, either through a penetrating poling probe 406, through a conductive via (not shown), or by scraping the polymer stack 110 to expose the poling pad 402. Generally, the poling pad 402 is only exposed to a source of the poling voltage during a manufacturing process. The poling pad 402 and/or the upper poling electrode 405 may be removed after poling. In operation, the lower electrode 118 may be configured to receive a modulation voltage from a driver circuit portion 408 and the upper electrode 116 may be configured to receive a modulation voltage from a second driver circuit portion 410. To protect the semiconductor integrated circuit portions 408, 410 from dielectric breakdown damage during poling, the poling electrode 405, which is electrically isolated from semiconductor circuitry, typically receives a poling voltage while the poling pad, and hence the bottom electrode, is held at ground. Subsequent to poling, a conductive via 412 may be formed to form a conductive path between the top high speed electrode (not shown) and a conductive pad 414.

Figure 5:
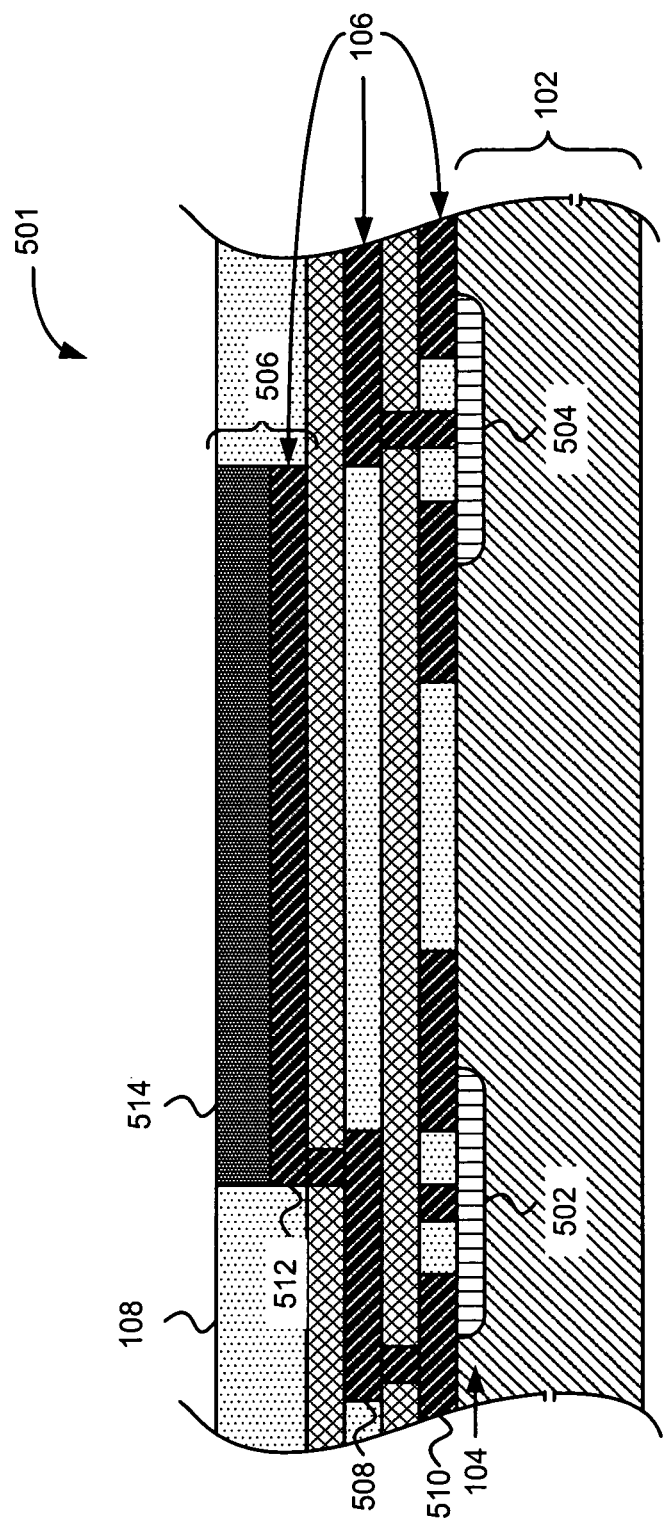
FIG. 5 is a side sectional view of a planarized semiconductor integrated circuit configured to drive a thickened bottom electrode of an electro-optic device, according to an embodiment.
Figure 6:
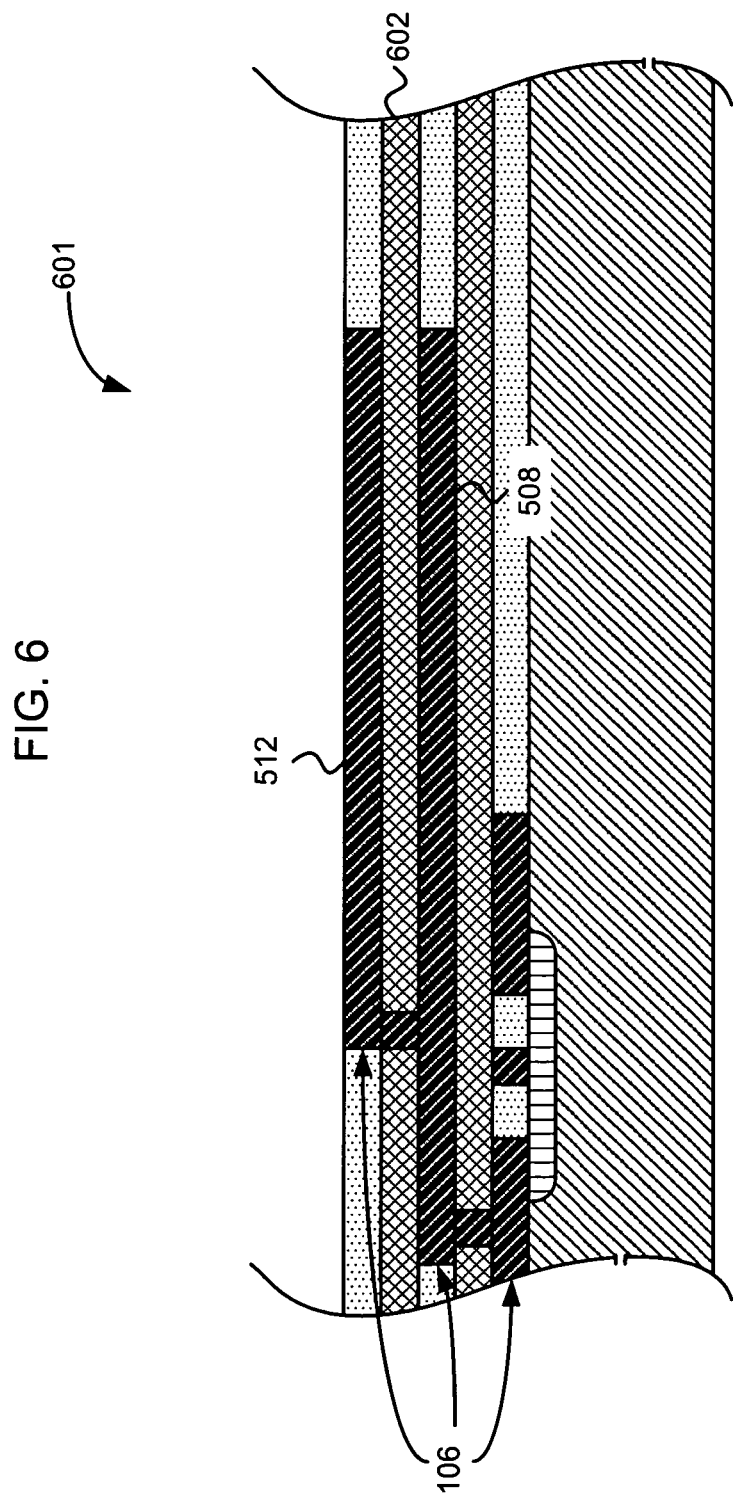
FIG. 6 is a side sectional view of a planarized semiconductor integrated circuit configured to drive a bottom electrode of an electro-optic device, according to another embodiment.
Figure 7:
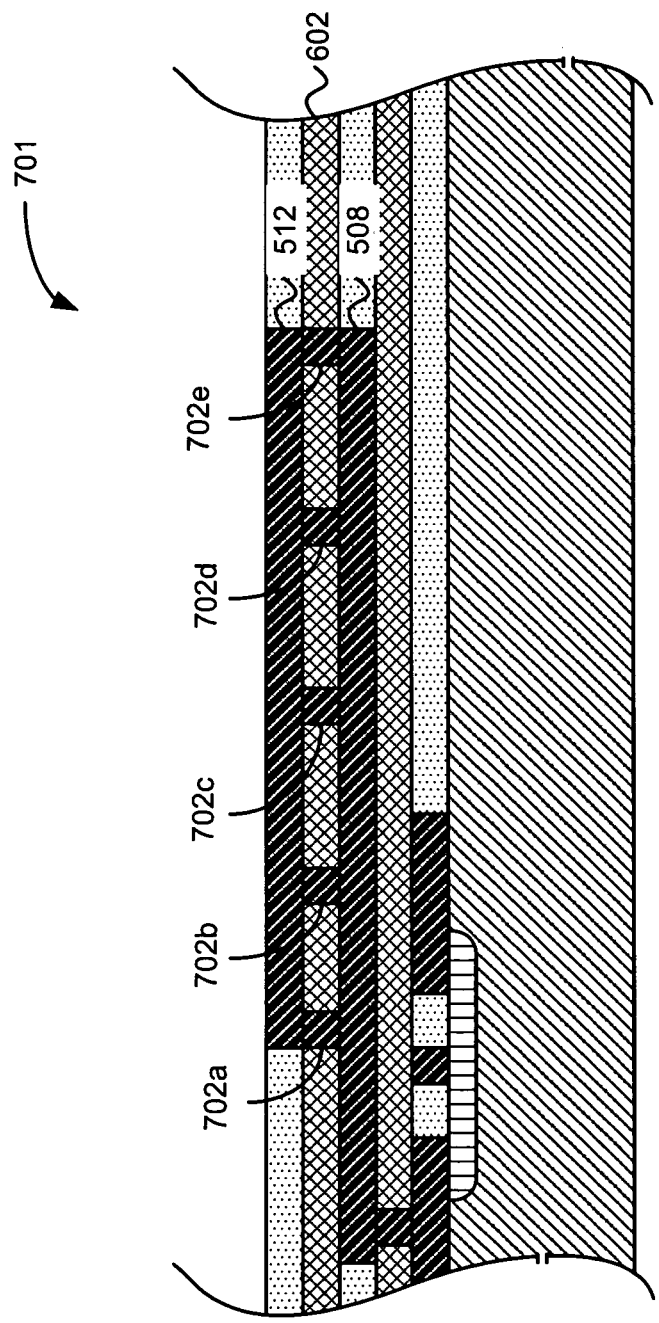
FIG. 7 is a side sectional view of a planarized semiconductor integrated circuit configured to drive a bottom electrode of an electro-optic device, according to another embodiment.

FIGS. 5, 6 and 7 illustrate embodiments for forming bottom electrodes that include a semiconductor metallization layer disposed below the planarization layer 108.

FIG. 5 is a partial side sectional diagram of an integrated electro-optic circuit 501, according to an embodiment.

A semiconductor integrated circuit 102 includes a semiconductor substrate with at least one conductor layer 106 formed at or near its top surface. Semiconductor devices 502, 504 may be formed in regions of a patterned doped layer at the surface of the semiconductor substrate, such as by methods including p and n doping, etc. The conductor layer 106 may be formed as a single conductor layer, for example. Alternatively, the conductor layer 104 may include one or more of a plurality of conductor layers 506, 508, 510.

According to an embodiment, a portion of the conductor layer 106 may be formed by successively forming a first layer of conductive material 512 and then a second layer of conductive material 514 one above the other. Such successively formed layers may be made such that the successive layers are substantially in direct contact with one another, such as with no intervening material or with only a relatively thin adhesion layer formed therebetween.

FIG. 6 is a side sectional view of a planarized semiconductor integrated circuit 601 configured to drive a bottom electrode of an electro-optic device, according to another embodiment.

The conductor layer 106 may include an upper layer 512 of a plurality of conductor layers 106. An upper conductive layer 512 may be formed over one or more similarly shaped lower (e.g. "buried") conductor layers 508, but with one or more layers of insulating material 602 disposed therebetween.

FIG. 6 is a side sectional view of a planarized semiconductor integrated circuit configured to drive a bottom electrode of an electro-optic device, according to another embodiment.

FIG. 7 is a side sectional view of a planarized semiconductor integrated circuit 701 configured to drive a bottom electrode of an electro-optic device, according to another embodiment.

Alternatively, the at least one conductor layer 106 may include an upper conductor layer 512 may be held in electrical continuity with one or more lower conductor layers 508, such as by forming and filling a plurality of conductive vias 702a, 702b, 702d, and 702e through one or more insulating layers 602 between the respective conductive layers 512, 508.

At least portions of the one or more conductive layers 106 may, for example, be formed to include a metal such as aluminum, copper, gold, and/or silver and alloys thereof. The one or more conductive layers 106 may additionally or alternatively be formed from a semiconductor material such as doped polysilicon.

Referring to FIG. 5, the conductive layer 106 may include a first portion 512 formed according to a photolithographically defined process such as CVD, etc. and a second portion 514 formed by electroplating the first portion. Accordingly, the actual and/or effective thickness of the conductive layer 106 may vary rather significantly, according to various embodiments. Additionally or alternatively, the conductive layer 106 may correspond to a conductive channel formed in the semiconductor substrate itself.

Referring to FIGS. 1A and 1B, one or more conductive layers 106 may be formed to provide separated structures 118, 138 as described above. Such separated structures 118, 138 may for example be formed as separated electrodes including, for example, ground electrodes or high speed strip electrodes. While the one or more conductive layers 106 is shown as being formed as separated structures 118, 138, alternatively the one or more conductive layers 106 may be formed as a substantially continuous structure, such as a ground electrode, for example.

Figure 8:
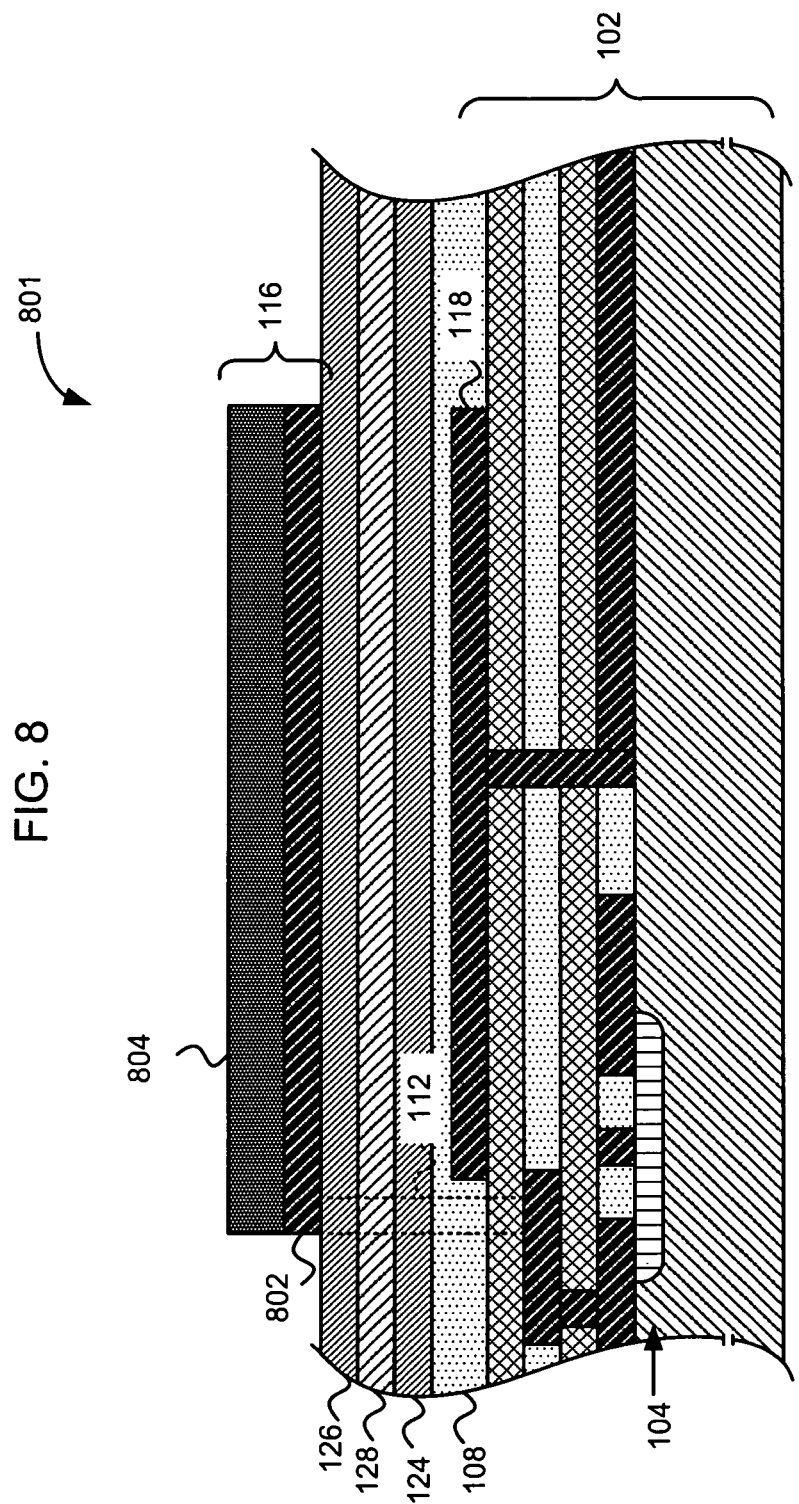
FIG. 8 is a side sectional view of an electro-optic polymer semiconductor integrated circuit including top and bottom electrodes, according to an embodiment.

FIG. 8 is a side sectional view of an electro-optic polymer semiconductor integrated circuit 801 including upper and bottom electrodes 116, 118, respectively, according to an embodiment. The upper electrode 116 may be formed from two layers 802 and 804 and may be driven by a semiconductor integrated device including a doped region 104 through a conductive via 112 as shown.

The optical polymer stack 110 may include one or more bottom cladding layers 124, a waveguide core 128, and one or more top cladding layers 126. Typically the refractive indices of the one or more bottom cladding layers 124, waveguide core 128, and one or more top cladding layers 126 are selected to guide at least one wavelength of light along the core. For example, the top and bottom clad layers 126, 124 may be selected have an index of refraction of about 1.35 to 1.60 and the waveguide core 128 may be selected to have a nominal index of refraction of about 1.57 to 1.9. According to one illustrative embodiment, the top and bottom clad layers 126, 124 have an index of refraction of about 1.50 and the waveguide core 128 has an index of refraction of about 1.74. The at least one wavelength of light may include light in the C or L band at about 1510 to 1620 nanometers wavelength. According to one embodiment, the light is at about 1550 nanometers wavelength. According to embodiments, the one or more bottom clad, side clad, and/or one or more top clad layers may include materials such as polymers (e.g., crosslinkable acrylates or epoxies or electro-optic polymers with a lower refractive index than electro-optic polymer layer), inorganic-organic hybrids (e.g., "sol-gels"), and inorganic materials (e.g., SiOx).

According to an embodiment, at least a portion of the waveguide core 128 includes an electro-optic polymer core. For example, the electro-optic polymer core 120 may include poled electro-optic chromophores whose index of refraction is variable as a function of electric field strength passed therethrough. (Optionally, one or more portions of the bottom and/or top clad layers 124, 126 may also include electro-optic material.)

The electro-optic polymer may be, for example, a guest-host system, a side chain polymer, a crosslinkable system, or a combination thereof. Various taper and butted structures may form borders between non-electro-optic and electro-optic portions of the optical polymer waveguide core 128.

According to an embodiment, the voltage of the upper electrode 116 may be toggled and the voltage of the lower electrode 118 may be maintained at a relatively constant (e.g. ground) potential to produce the modulated electrical field across the electro-optic portion(s) 120 of the waveguide core 128. According to another embodiment, the voltage of the upper electrode 116 may be maintained at a relatively constant (e.g. ground) potential and the voltage of the lower electrode 118 may be toggled. According to another embodiment, the voltage of both the upper electrode(s) 116 and the lower electrode(s) 118 may be toggled, for example in opposing directions. When both electrodes 116 and 118 are toggled, the magnitude of respective voltage swings may be balanced according to the current carrying capacity of the respective conductive layers, for example with a greater voltage toggle being impressed upon a thicker conductor structure.

According to an embodiment, an electrical propagation velocity through one or more electrodes 116, 118 may be approximately matched to an optical propagation velocity through the light guiding structures 130 and the electro-optic core 120. For example, referring to FIG. 1A, an electrode 118 formed in the conductor layer 106 may receive an electrical pulse at its left end, with the electrical pulse then traveling left-to-right along the electrode 118 while light energy 122 also travels left-to-right through the electro-optic core 120. Similarly, an electrode 116 may receive an electrical pulse at its left end, the electrical pulse then traveling left-to-right along its length, parallel to light 122 travel through the electro-optic core 120. Such electrode structures may be referred to as strip electrodes. Such velocity matching between the electrical and optical signals may provide enhanced modulation bandwidth, cleaner modulated signals, etc. compared to alternative electrode structures.

Referring to FIG. 1B, a two optical channel device 134 such as a Mach Zehnder modulator, a single optical channel device 132 such as a phase modulator or other combinations may be formed according to various embodiments. A plurality of devices may be formed on a given die.

While the light guiding structures 130, aka waveguides, are shown as being formed using a trench waveguide approach, other waveguide structures may be used. For example a quasi-trench, rib, quasi-rib, side clad, etc. may be used singly or in combination to provide light guiding functionality.

Figure 9:
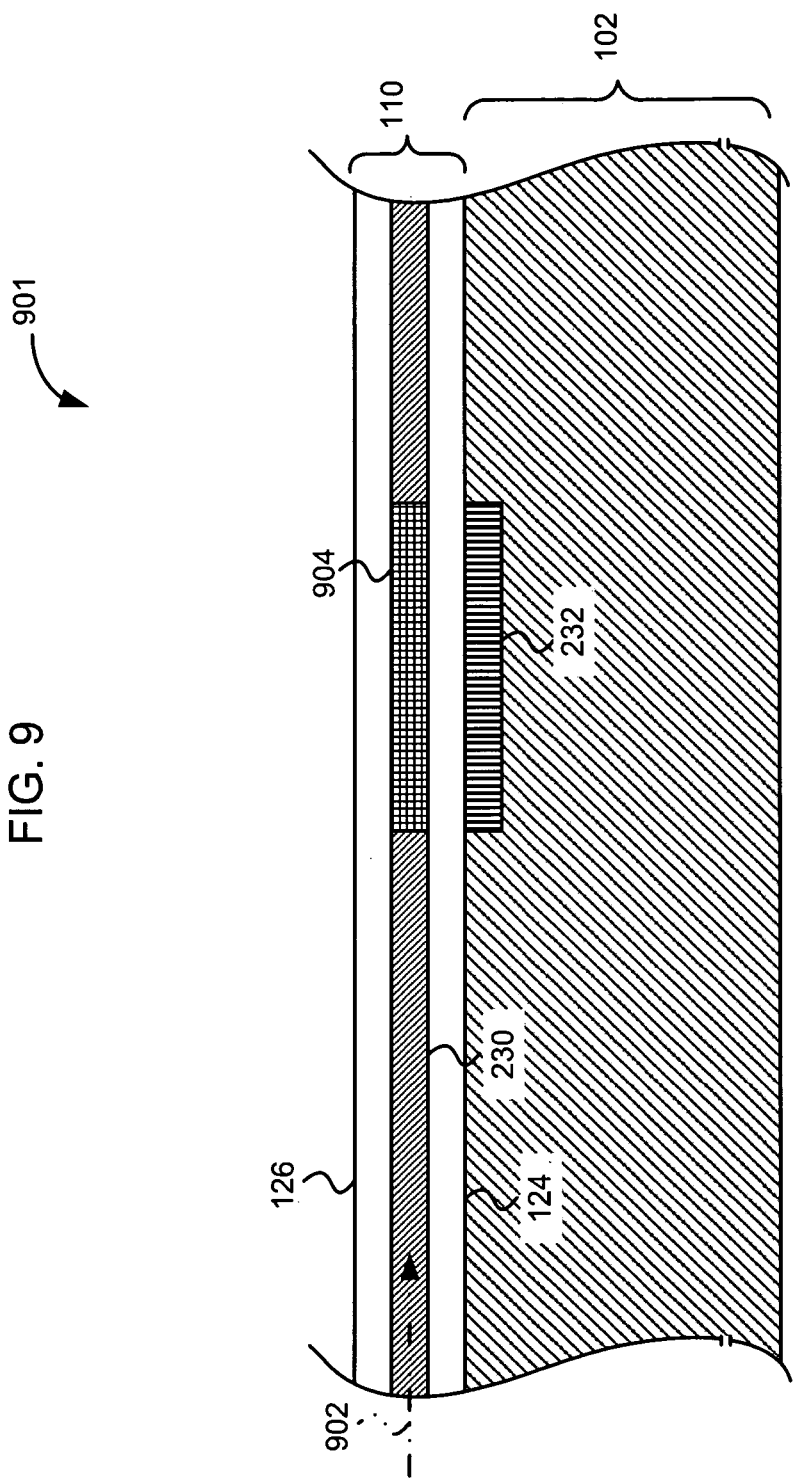
FIG. 9 is a sectional diagram of an integrated photodetector configured to provide a feedback signal to an integrated electro-optic circuit, according to an embodiment.

FIG. 9 illustrates an approach for forming the feedback photodetector 232 of FIG. 2, according to an embodiment. Tapped light 902 is received through the feedback waveguide 230 formed between the bottom and top cladding layers 124, 126. A scattering region 904 is formed to scatter the received tapped light 902. The scattering region may, for example, be loaded with a scattering agent such as titanium dioxide. Alternatively, the scattering region 904 may include one or more scattering faces etched into the waveguide 230 and configured to partially reflect, refract, or diffract the received light. At least a portion of the received light is launched downward where it is received and converted into an electrical signal by an integrated silicon photodetector 904. The integrated photodetector 904 may, for example, include a silicon photodiode.

Alternatively, the bottom of the output waveguide 226 (FIG. 2) or underlying bottom cladding layer 124 may be partially etched or otherwise modified to scatter a portion of the modulated output light travelling along the output waveguide 226 to impinge upon the integrated photodiode 904.

The photodetector 904 may be formed to include a photodiode, a photoresistor, or phototransistor. Alternatively, a photodetector may be coupled to the top surface of the optical polymer stack 104 and electrically coupled to the analog-to-digital convertor 234 of FIG. 2. Alternatively, the photodetector 232 may include integrated analog-to-digital conversion circuitry, and a separate analog-to-digital convertor may be omitted.

The descriptions and figures presented herein are necessarily simplified to foster ease of understanding. Other embodiments and approaches may be within the scope of inventions described herein. Inventions described herein shall be limited only according to the appended claims, which shall be accorded their broadest valid meaning.

What is claimed:

1. An integrated electro-optic modulator, disposed on a single semiconductor die, comprising:
   an integrated circuit formed on a surface of a semiconductor die, the integrated circuit including:
   a first plurality of pads configured to receive a corresponding first plurality electrically modulated signals;
   a multiplexer operatively coupled to the first plurality of pads and configured to multiplex the first plurality of electrically modulated signals into a second at least one electrically modulated signal fewer in number than the first plurality;
   at least one amplifier operatively coupled to receive the second at least one electrically modulated signal and amplify the second at least one electrically modulated signal to produce at least one driver signal; and
   disposed over the integrated circuit:
   a first electrode configured to propagate a radio frequency, microwave, or radio frequency and microwave signal, the first electrode having a length and operatively coupled to receive the at least one driver signal at a first end from the integrated circuit and responsively propagate a corresponding plurality of electrical pulses along its length;
   a first polymer input waveguide disposed over the integrated circuit and operative to propagate an input light signal;
   a first poled electro-optic organic chromophore active region disposed over the integrated circuit and parallel to the first high speed electrode, configured to receive the input light signal from the first polymer input waveguide and, responsive to the electrical pulses propagated along the length of the first high speed electrode, modulate the propagation velocity of the light signal to produce a phase modulated output light signal;
   a first polymer output waveguide disposed over the integrated circuit and operative to propagate the phase modulated output light signal; and
   configured as a portion of the integrated circuit or disposed over the integrated circuit, a first termination circuit operatively coupled to a second end of the high speed electrode and configured to impedance match the plurality of electrical pulses.

2. The integrated electro-optic modulator of claim 1, further comprising:
   as a portion of the integrated circuit, a calibration storage circuit configured to store a calibration value corresponding to a performance parameter of the electro-optic modulator.

3. The integrated electro-optic modulator of claim 1, wherein the integrated circuit includes a conductor layer; wherein the first polymer input waveguide, the first poled electro-optic organic chromophore active region, and the first polymer output waveguide are formed in an optical polymer stack disposed on the integrated circuit and the conductor layer;
   wherein the first poled electro-optic organic chromophore active region is disposed over the conductor layer; and
   wherein the integrated circuit is configured to drive the first electrode with a voltage signal selected to drive the first poled electro-optic organic chromophore active region.

4. The integrated electro-optic modulator of claim 3, wherein the first poled electro-optic organic chromophore active region defines an electro-optic core.

5. The integrated electro-optic modulator of claim 3, wherein the first electrode is driven with a toggled voltage to drive the first poled electro-optic organic chromophore active region.

6. The integrated electro-optic modulator of claim 3, wherein the first electrode is driven with a ground voltage to drive the first poled electro-optic organic chromophore active region.

7. The integrated electro-optic modulator of claim 3, further comprising:
   a planarization layer adjacent to the conductor layer.

8. The integrated electro-optic modulator of claim 3, wherein the conductor layer includes a metal layer of the integrated circuit.

9. The integrated electro-optic modulator of claim 3, wherein the conductor layer includes the first electrode.

10. The integrated electro-optic modulator of claim 9, wherein each of the plurality of electrical pulses propagated by the first electrode travels at a first propagation rate substantially corresponding to a second propagation rate of light traveling through the first poled electro-optic organic chromophore active region.

11. The integrated electro-optic modulator of claim 3, wherein the optical polymer stack includes a guiding structure including at least one selected from the group consisting of a trench waveguide, a rib waveguide, a quasi-trench waveguide, a quasi-rib waveguide, and a side clad.

12. The integrated electro-optic modulator of claim 3, wherein the conductor layer includes a patterned conductor layer patterned to define a bottom electrode, and further comprising:
   a first planarization layer disposed to planarize a surface superjacent the bottom electrode.

13. The integrated electro-optic modulator of claim 12, wherein the optical polymer stack includes a bottom cladding disposed superjacent the first planarization layer.

14. The integrated electro-optic modulator of claim 13, wherein the first poled electro-optic organic chromophore active region is disposed superjacent the bottom cladding.

15. The integrated electro-optic modulator of claim 14, wherein the optical polymer stack further includes a top cladding layer disposed superjacent the first poled electro-optic organic chromophore active region.

16. The integrated electro-optic modulator of claim 15, further comprising:
   a top electrode disposed superjacent the top cladding layer, the top electrode being operatively coupled to the integrated circuit.

17. The integrated electro-optic modulator of claim 16, wherein the bottom electrode and the top electrode are coupled to receive electrical signals from the integrated circuit and responsively cooperate to provide corresponding electric fields across the first poled electro-optic organic chromophore active region.

18. The integrated electro-optic modulator of claim 17, wherein the bottom electrode is configured to be the first electrode and the top electrode is configured to be a ground electrode.

19. The integrated electro-optic modulator of claim 17, wherein the top electrode is configured to be the first electrode and the bottom electrode is configured to be a ground electrode.

20. The integrated electro-optic modulator of claim 17, further comprising plated metal over at least one of the group consisting of the bottom electrode and the top electrode.

21. The integrated electro-optic modulator of claim 3, wherein the first poled electro-optic organic chromophore active region includes at least one selected from the group consisting of a guest-host electro-optic polymer and a large appendage chromophore formed according to a donor-pi-acceptor structure.

22. The integrated electro-optic modulator of claim 3, wherein the conductor layer includes a bottom electrode and a poling coupling pad electrically coupled to the bottom electrode.

23. The integrated electro-optic modulator of claim 3, wherein the integrated circuit includes an integrated circuit formed using at least one process selected from the group consisting of MOS, NMOS, PMOS, CMOS, Bipolar, and BiCMOS operatively coupled to at least one electrode formed in the conductor layer.

24. The integrated electro-optic modulator of claim 3, wherein:
the optical polymer stack includes an electro-optic device; and wherein the integrated circuit includes a feedback circuit configured to receive a second light signal and responsively control modulation of a first light signal by the electro-optic device.

* * * * *